United States Patent
Leroy et al.

(10) Patent No.: US 10,992,204 B2
(45) Date of Patent: Apr. 27, 2021

(54) ROTARY ELECTRICAL MACHINE WITH OPTIMISED COOLING

(71) Applicant: Valeo Equipements Electriques Moteur, Creteil (FR)

(72) Inventors: Virginie Leroy, Creteil (FR); Michaël Hanquez, Creteil (FR); Hugues Gervais, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 265 days.

(21) Appl. No.: 16/098,502

(22) PCT Filed: May 12, 2017

(86) PCT No.: PCT/FR2017/051154
§ 371 (c)(1),
(2) Date: Nov. 2, 2018

(87) PCT Pub. No.: WO2017/194896
PCT Pub. Date: Nov. 16, 2017

(65) Prior Publication Data
US 2019/0149017 A1    May 16, 2019

(30) Foreign Application Priority Data
May 13, 2016 (FR) ...................... 1654291

(51) Int. Cl.
*H02K 9/19* (2006.01)
*H02K 5/20* (2006.01)

(52) U.S. Cl.
CPC ............... *H02K 9/19* (2013.01); *H02K 5/20* (2013.01)

(58) Field of Classification Search
CPC ............ H02K 9/19; H02K 9/193; H02K 9/20; H02K 5/20
See application file for complete search history.

(56) References Cited

U.S. PATENT DOCUMENTS 3,371,613 A * 3/1968 Dahlgren .............. F04D 29/586
                                                    417/368
5,674,056 A * 10/1997 Yamamoto .............. F04D 13/14
                                                    417/366
(Continued)

FOREIGN PATENT DOCUMENTS

CN    202076876 U    12/2011
CN    103187831 A    7/2013
(Continued)

OTHER PUBLICATIONS

International Search Report issued in PCT/FR2017/051154 dated Aug. 17, 2017 (3 pages).
(Continued)

*Primary Examiner* — Robert W Horn
(74) *Attorney, Agent, or Firm* — Osha Bergman Watanabe & Burton LLP

(57) ABSTRACT

The invention relates mainly to a rotary electrical machine including: a bearing (12); a stator (11) including a stator body (13); and a tubular ring (27), said stator body (13) being mounted braced in the ring (27); a cooling chamber (28) for circulating coolant liquid defined by an outer periphery of said tubular ring (27) and an inner periphery of said bearing (12); said bearing (12) including an intake and an outlet of coolant liquid, said machine including a separating wall (42) for separating said cooling chamber (28) extending between said intake and said outlet of coolant liquid, said separating wall (42) being added relative to said tubular ring (27) and including at the ends thereof attachment members for holding said wall (42) on said tubular ring (27).

15 Claims, 4 Drawing Sheets

(56) References Cited

U.S. PATENT DOCUMENTS

| | | | | |
|---|---|---|---|---|
| 8,147,216 B2* | 4/2012 | Schiffhauer | ............. | F04B 53/08 |
| | | | | 417/371 |
| 8,973,363 B2* | 3/2015 | Rohwer | ................ | B60L 3/0061 |
| | | | | 60/714 |
| 9,046,087 B2* | 6/2015 | Schiffhauer | ............. | F04B 17/03 |
| 9,450,468 B2* | 9/2016 | Chamberlin | ............ | H02K 11/33 |
| 10,516,316 B2* | 12/2019 | Carrillo | .................... | H02K 5/18 |
| 10,666,111 B2* | 5/2020 | Ohashi | .................. | H02K 15/14 |
| 2019/0149017 A1* | 5/2019 | Leroy | ...................... | H02K 9/19 |
| | | | | 310/54 |

FOREIGN PATENT DOCUMENTS

| | | |
|---|---|---|
| CN | 103516129 A | 1/2014 |
| CN | 104798293 A | 7/2015 |
| DE | 10 2013 219872 A1 | 4/2015 |
| DE | 10 2013 219876 A1 | 4/2015 |
| DE | 102013219876 A1 * | 4/2015 ............... H02K 5/20 |
| JP | S63-7962 A | 1/1988 |
| JP | S63-7962 U | 1/1988 |
| JP | H02-7849 A | 1/1990 |
| JP | 2008-301646 A | 12/2008 |
| WO | 2006/106086 A1 | 10/2006 |

OTHER PUBLICATIONS

Written Opinion of the International Searching Authority issued in PCT/FR2017/051154 dated Aug. 17, 2017 (7 pages).

First Office Action in corresponding Chinese Application No. 2017800231154, dated Jan. 2, 2020 (10 pages).

Second Office Action in corresponding Chinese Application No. 2017800231154, dated Sep. 3, 2020 (10 pages).

* cited by examiner

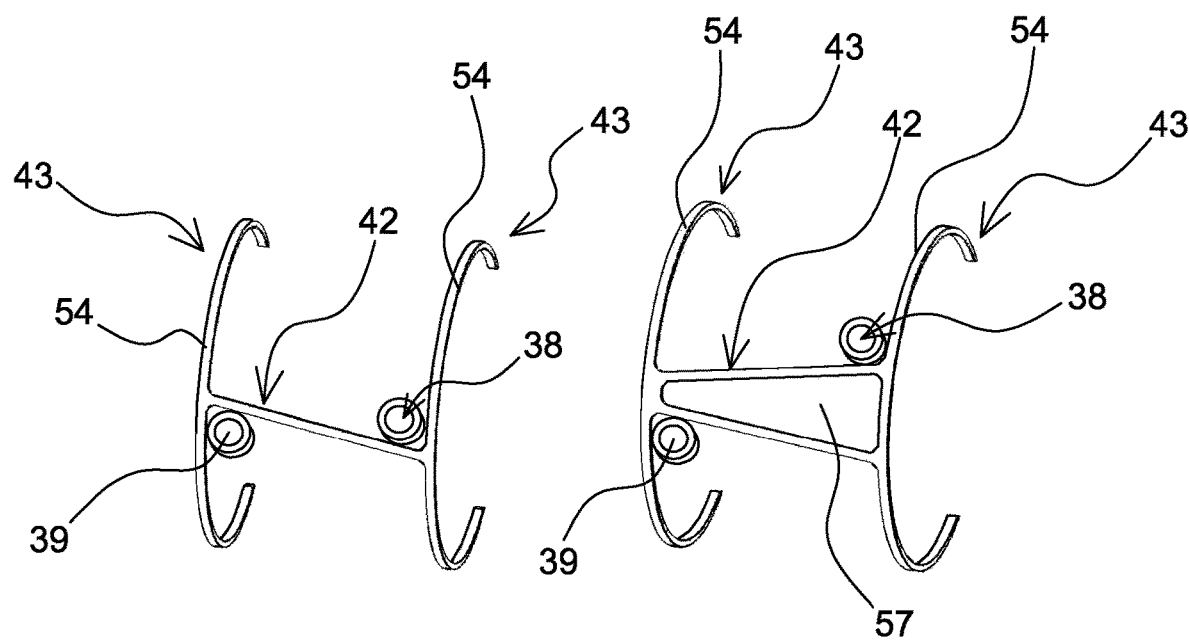
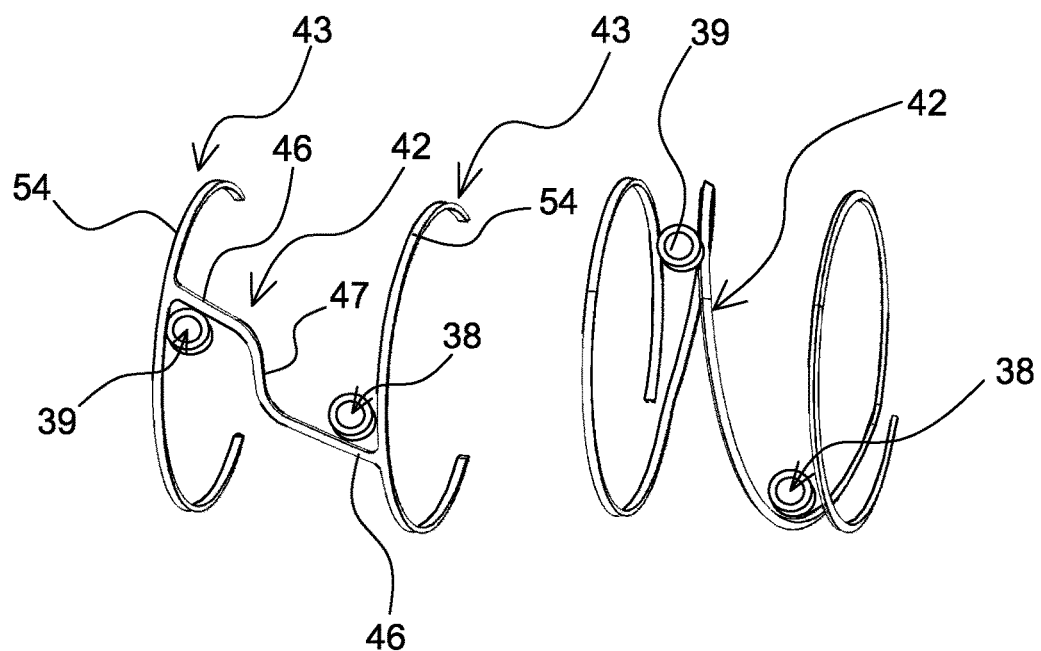

ROTARY ELECTRICAL MACHINE WITH OPTIMISED COOLING

The invention relates to a rotary electrical machine with optimised cooling. The invention relates to the field of electrical machines such as motors, alternators, or alternator-starters.

Electrical machines are known comprising a rotor integral with a driving and/or driven shaft, and a stator which surrounds the rotor with the presence of an air gap. The stator is supported by a housing which comprises bearings for fitting of the rotor shaft with rotation.

The rotor can comprise a body formed by a stack of metal plate sheets which are retained in the form of a set by means of an appropriate securing system. The rotor comprises poles which are formed for example by permanent magnets accommodated in cavities provided in the magnetic mass of the rotor. Alternatively, in a so-called "projecting" poles architecture, the poles are formed by coils wound around arms of the rotor. Alternatively, the rotor comprises poles with claws.

In addition, the stator comprises a body constituted by a stack of thin metal plates forming a crown, the inner face of which is provided with notches open towards the interior in order to receive phase windings. These windings pass through the notches in the stator body and form chignons which project on both sides of the stator body. The phase windings are obtained for example from a continuous wire covered with enamel, or from conductive elements in the form of pins connected to one another by welding. Alternatively, in the case of a winding of the concentric type, the polyphase electrical machine comprises a stator winding formed by a plurality of preformed coils fitted around teeth of the stator by means of a coil insulator.

The heat which is generated by the circulation of the current through the winding of the stator can be discharged to a cooling circuit. This cooling circuit comprises a chamber in which a coolant fluid circulates. The cooling chamber is delimited by an inner periphery of the housing and an outer periphery of a tubular ring in which the stator body is shrink-fitted. The outer periphery of the stator body is thus in contact with the inner periphery of the tubular ring, in order to facilitate the discharge of the heat to the cooling chamber. However, the creation of the cooling chamber can give rise to deformation of the ring in the area of shrink-fitting with the stator body, which is liable to give rise to problems of mechanical strength, efficiency and sealing.

The objective of the present invention is to eliminate this disadvantage efficiently by proposing a rotary electrical machine comprising:
- a bearing;
- a stator comprising a stator body;
- a tubular ring, the said stator body being shrink-fitted in the said tubular ring;
- a cooling chamber for the circulation of cooling liquid delimited by an outer periphery of the said tubular ring and an inner periphery of the said bearing;
- the said bearing comprising a cooling liquid intake and outlet, characterised in that the said rotary electrical machine comprises a separation wall in order to separate the said cooling chamber which extends between the said intake and the said outlet for the cooling liquid, such that the cooling liquid circulates from the said intake to the said outlet for the cooling liquid, the said separation wall being added-on relative to the said tubular ring, and comprising at its ends securing units in order to retain the said separation wall on the said tubular ring.

The invention thus makes it possible to prevent the ring from being deformed in the shrink-fitted area by the separation wall during its securing. The invention thus guarantees a good contact surface between the outer periphery of the stator body and the inner periphery of the ring during the shrink-fitting.

According to one embodiment, the stator comprises a set of metal plates.

According to one embodiment, the said separation wall extends in a straight manner.

According to one embodiment, the said separation wall is inclined relative to an axis of the said tubular ring.

This inclination of the wall makes it possible to facilitate the diffusion or recuperation of the liquid in the chamber.

According to one embodiment, the intake and the outlet for the cooling liquid are positioned at a single one of the axial ends of the separation wall, in order to facilitate the diffusion or recuperation of the liquid in the chamber.

According to one embodiment, the intake for the cooling liquid is positioned at one of the axial ends of the separation wall, and the outlet for the cooling liquid is positioned at the other one of the axial ends of the separation wall, in order to facilitate the diffusion or recuperation of the liquid in the chamber.

According to one embodiment, the said separation wall has a curved form.

According to one embodiment, the rotary electrical machine comprises a single separation wall in order to separate the said cooling chamber which extends between the said intake and the said outlet for the cooling liquid.

According to one embodiment, the wall extends axially from one axial side of the tubular ring to the other axial side of the tubular ring.

According to one embodiment, the said separation wall comprises a central recess designed to form a space between the said intake and the said outlet for the cooling liquid, such as to be isolated from the cooling liquid when the cooling liquid is circulating in the said cooling chamber.

According to one embodiment, the said separation wall is in the form of a spiral wound around the said tubular ring.

According to one embodiment, the said separation wall has a cross-section with a rectangular form.

According to one embodiment, the said tubular ring comprises two annular grooves each positioned at an axial end of the said tubular ring, each annular groove being provided in a rim relative to an outer face of the said tubular ring, the said annular grooves being designed to receive a seal in order to ensure the sealing of the said cooling chamber.

According to one embodiment, the said securing units comprise securing lugs which are welded onto a rim of an annular groove.

According to one embodiment, at each end of the said separation wall, the said securing lugs extend on both sides of the said separation wall.

According to one embodiment, the said separation wall and the said securing units are made of metal.

According to one embodiment, the said securing units form a collar which is open and resiliently deformable in order to be able to be snapped onto an outer periphery of the said tubular ring.

According to one embodiment, the rotary electrical machine comprises a device for retention in rotation of the said separation wall.

According to one embodiment, the said separation wall is made of plastic material.

According to one embodiment, the said device for retention in rotation comprises bosses provided on the side of an outer face of the said tubular ring.

According to one embodiment, the said bosses are positioned on both sides of the said separation wall.

According to one embodiment, the said bosses are positioned in the said central recess in the said separation wall.

According to one embodiment, the said separation wall is made of metal.

According to one embodiment, the said device for retention in rotation comprises welds formed between a securing unit and a corresponding rim of the said groove.

The invention will be better understood by reading the following description and examining the figures which accompany it. These figures are provided purely by way of illustration, and in no way limit the invention.

FIGS. 5a to 5d are views in perspective illustrating variant embodiments of the separation wall of the cooling chamber;

Elements which are identical, similar or analogous retain the same reference from one figure to another.

Figure 1:
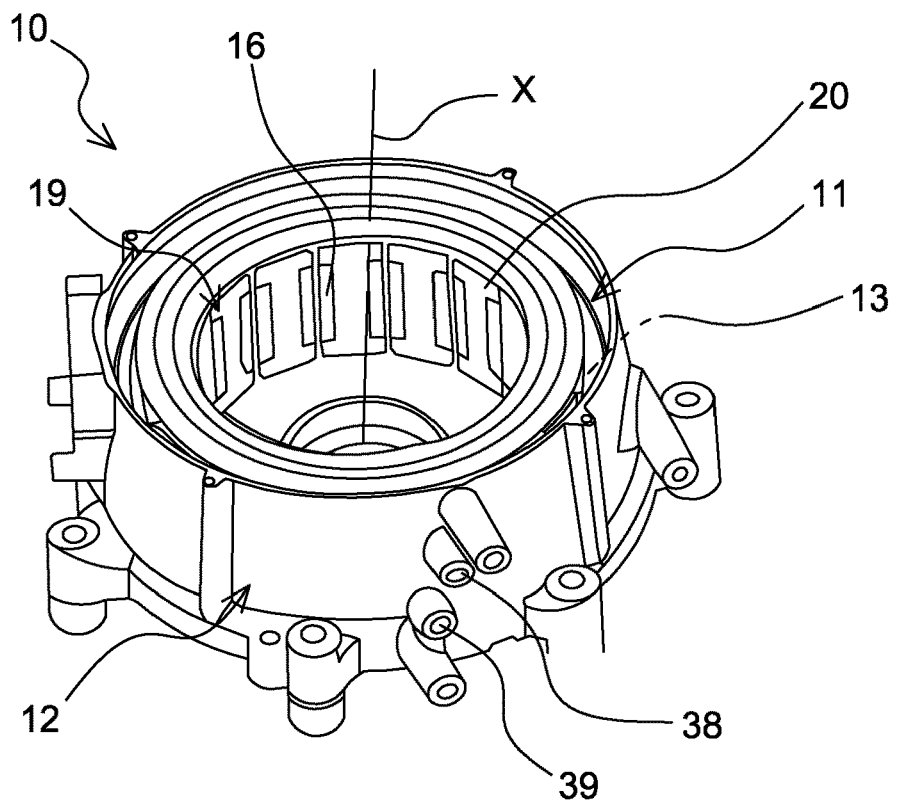
FIG. 1 shows a view in perspective of the stator and of the bearing of a rotary electrical machine according to the invention.

FIG. 1 shows a rotary electrical machine 10 comprising a stator 11 supported by a bearing 12. The stator 11 comprises a body 13 constituted by a stack of thin metal plates forming a crown, the lower face of which is provided with teeth 16 which delimit in pairs notches open towards the interior of the body 13 of the stator 11.

In the example represented, the winding 19 of the stator 11 is of the concentric type formed by a plurality of preformed coils 20 each fitted around a tooth 16 of the stator 11 by means of a coil insulator. As a variant, the winding 19 can be formed from windings passing through the notches in the stator body 13 and forming chignons which project on both sides of the body 13. The phase windings can be obtained for example from a continuous wire covered with enamel, or from conductive elements in the form of pins connected to one another by welding.

Figure 2:
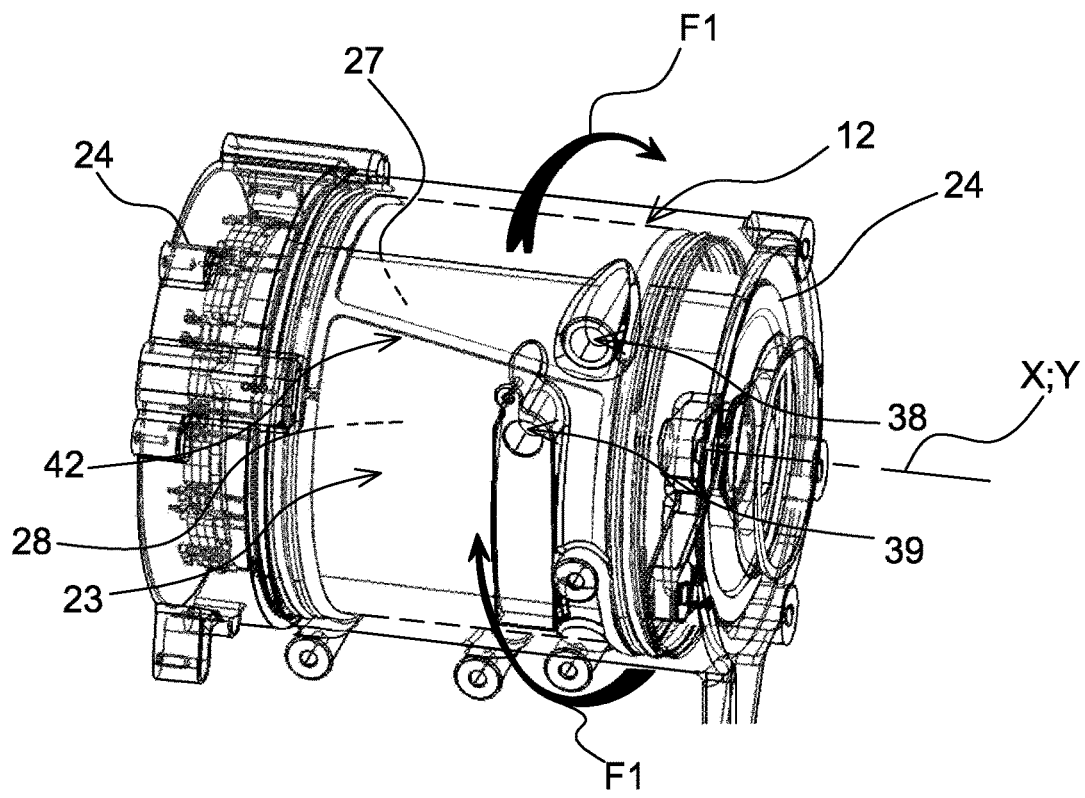
FIG. 2 is a view in perspective of a rotary electrical machine according to the invention, showing by transparency a separation wall of the cooling chamber.

More specifically, as illustrated by FIG. 2, the bearing 12 comprises a central wall 23 with an annular form with axial orientation, and two transverse end walls 24 with orientation which is substantially radial relative to the axis X of the machine. Each of the end walls 24 is provided in its centre with a roller bearing for fitting with rotation of an end of the shaft of the rotor (not represented).

The bearing 12 can be formed in two parts with a first part in the form of a dish comprising the central wall 23 and one of the end walls 24. This first part is assembled with a second part constituted by the other end wall 24. As a variant, the central wall 23 and the end walls 24 constitute distinct parts which are assembled to one another for example by means of assembly tie rods. The bearing 12 can for example be formed from a mouldable material which is a good conductor of heat, such as aluminium.

Figure 3:
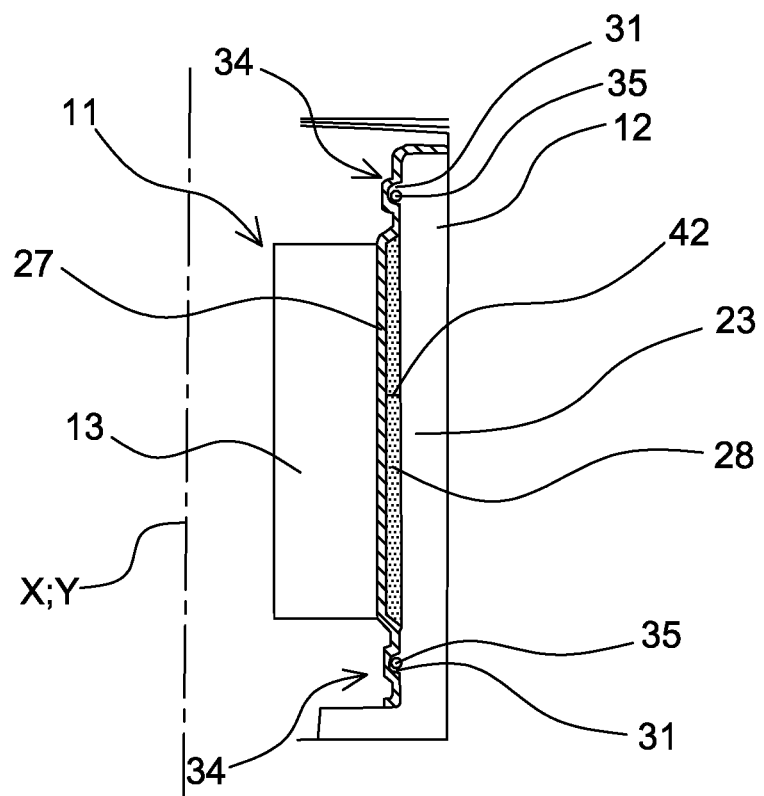
FIG. 3 is a view in partial schematic cross-section of a rotary electrical machine according to the invention illustrating the configuration of the cooling chamber.

As can be seen clearly in FIG. 3, the stator body 13 is shrink-fitted in a ring 27 with a tubular form. A cooling chamber 28 for the circulation of the cooling liquid is delimited by an outer periphery of the tubular ring 27 and an inner periphery of the central wall 23 of the bearing 12. The outer periphery of the stator body 13 is thus in contact with the inner periphery of the central wall 23 of the ring 27, in order to facilitate the discharge of the heat to the cooling chamber 28.

The ring 27 comprises two annular grooves 31, each positioned at an axial end of the ring 27. More specifically, each groove 31 is provided in a rim 34 relative to the outer face of the ring 27. Each groove 31 is designed to receive a seal 35 in order to ensure the sealing of the chamber 28.

One of the grooves 31 can have an inner diameter which is smaller than the other groove 31, such as to facilitate the insertion of the tubular ring 27 in the bearing 12.

The bearing 12 additionally comprises an intake 38 and an outlet 39 for the cooling liquid, which are shown in FIG. 2. A separation wall 42 makes it possible to separate the cooling chamber 28 extending between the intake 38 and the outlet 39 for the cooling liquid, such that the cooling liquid circulates according to the arrows F1, from the intake 38 to the outlet 39 for the cooling liquid, in order to discharge the heat generated by the winding 19 of the stator 11.

The separation wall 42 is added on relative to the ring 27, and comprises at its ends securing units 43 in order to retain the separation wall 42 on the ring 27.

In the embodiment in FIG. 2, the separation wall 42 extends in a straight manner between the two end rims 34 of the ring 27. The separation wall 42 can extend parallel to the axis Y of the ring 27 which coincides with the axis X when the ring 27 is fitted inside the rotary electrical machine 10.

Figure 4:
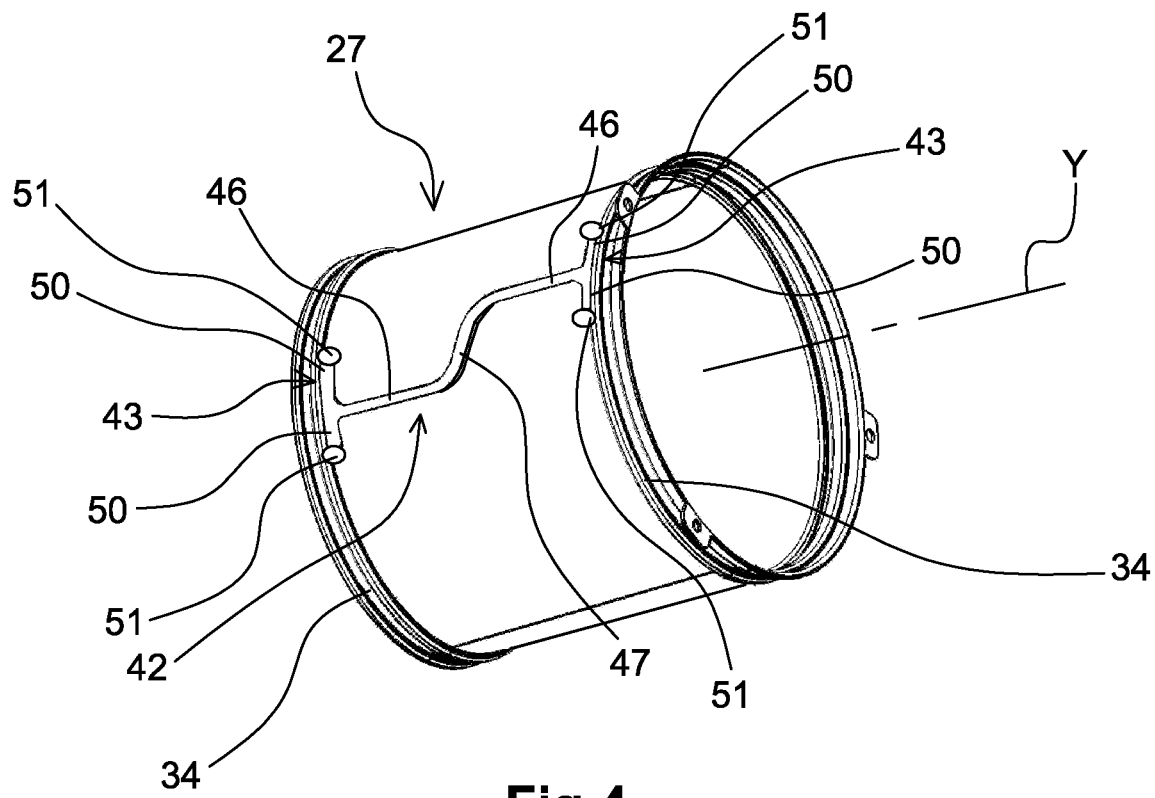
FIG. 4 is a view in perspective of the tubular ring and of a separation wall of the cooling chamber with a curved form.

Alternatively, as represented in FIG. 4, the separation wall 42 can have a curved form, for example the form of an elongate "S". The wall 42 thus has two substantially straight end portions 46 which are connected to one another by a curved portion 47 with a point of inflection according to which the curvature of the wall 42 changes direction.

In addition, the separation wall 42 comprises securing lugs 50 which form the securing units 43. These lugs 50 are welded at their free end on a rim 34 of a groove 31 according to welding areas with the reference 51. At each end of the separation wall 42, the lugs 50 extend on both sides of the separation wall 42. The lugs 50 also extend according to a portion of the circumferential periphery of the ring 27. The separation wall 42 and the securing lugs 50 are preferably made of metal.

Advantageously, the separation wall 42 can have a cross-section with a rectangular form, with a larger side of the rectangle supported against the outer periphery of the ring 27. This makes it possible to maximise the contact surface between the separation wall 42 and the outer periphery of the ring 27, in order to improve the sealing of the assembly.

In the embodiments in FIGS. 5a to 5d, the securing units 43 each form a collar 54 which is open and resiliently deformable, in order to be able to be snapped onto the outer periphery of the ring 27. For this purpose, in the non-stressed state, the collar 54 has an inner diameter which is slightly smaller than the outer diameter of the ring 27. In these embodiments, the separation wall 42 incorporating the open collars 54 at each of its axial ends can be made of a material based on metal or plastic, in order to provide it with a certain resilience.

The separation wall 42 can be inclined relative to the axis Y of the ring 27, as shown in FIG. 5a. Preferably, the intake 38 and the outlet 39 for the cooling liquid are positioned at angles formed by the central portion of the wall 42 and the collar 54, in order to facilitate the diffusion or recuperation of the liquid in the chamber.

In the embodiment in FIG. 5b, the separation wall 42 comprises a central recess 57, which is designed to form a space between the intake 38 and the outlet 39, such as to be isolated from the cooling liquid when the latter is circulating in the cooling chamber 28.

According to an embodiment in FIG. 5b, the intake 38 and the outlet 39 are each disposed at an axial end of the ring 27.

As a variant, the intake 38 and the outlet 39 can be disposed at the same axial end of the ring 27.

In the embodiment in FIG. 5c, the separation wall 42 has the curved form of FIG. 4, and is provided with ends 46 which are inclined relative to the axis Y of the ring 27. The securing units 43 which are situated at the ends of the wall 42 are formed by open collars 54.

In the embodiment in FIG. 5d, the separation wall 42 has the form of a spiral wound around the ring 27. In this configuration, the cooling liquid carries out a complete turn of the ring 27, before being discharged via the outlet 39.

Advantageously, the separation wall 42 can be designed to allow the cooling liquid to carry out a predetermined number of complete turns in the ring 27, before being discharged via the outlet 39.

Figure 6A:
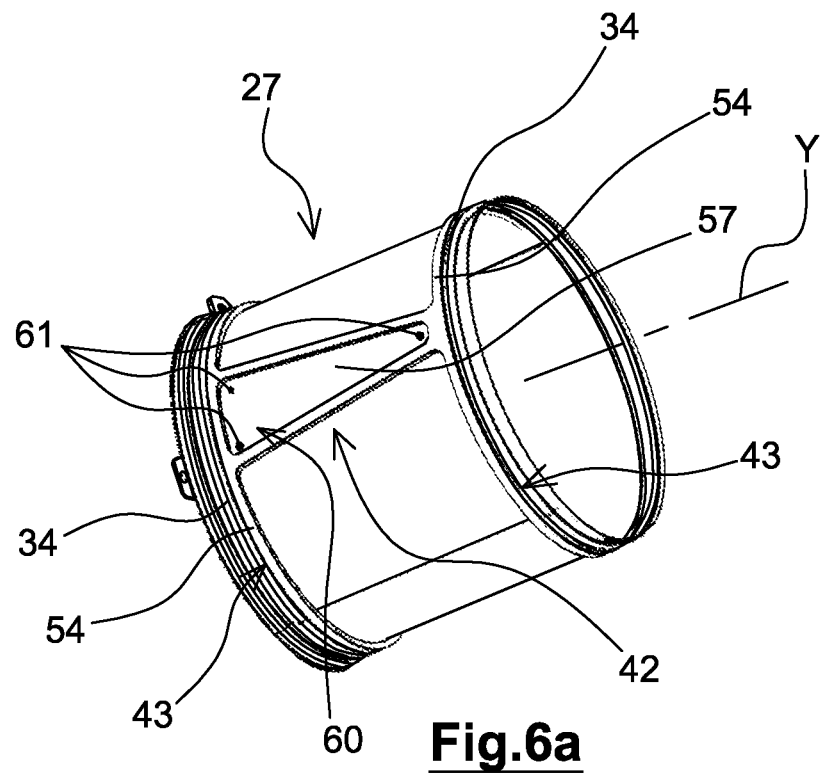
FIGS. 6a and 6b are views in perspective illustrating devices for retention in rotation of a separation wall of the cooling chamber according to the invention.
Figure 6B:
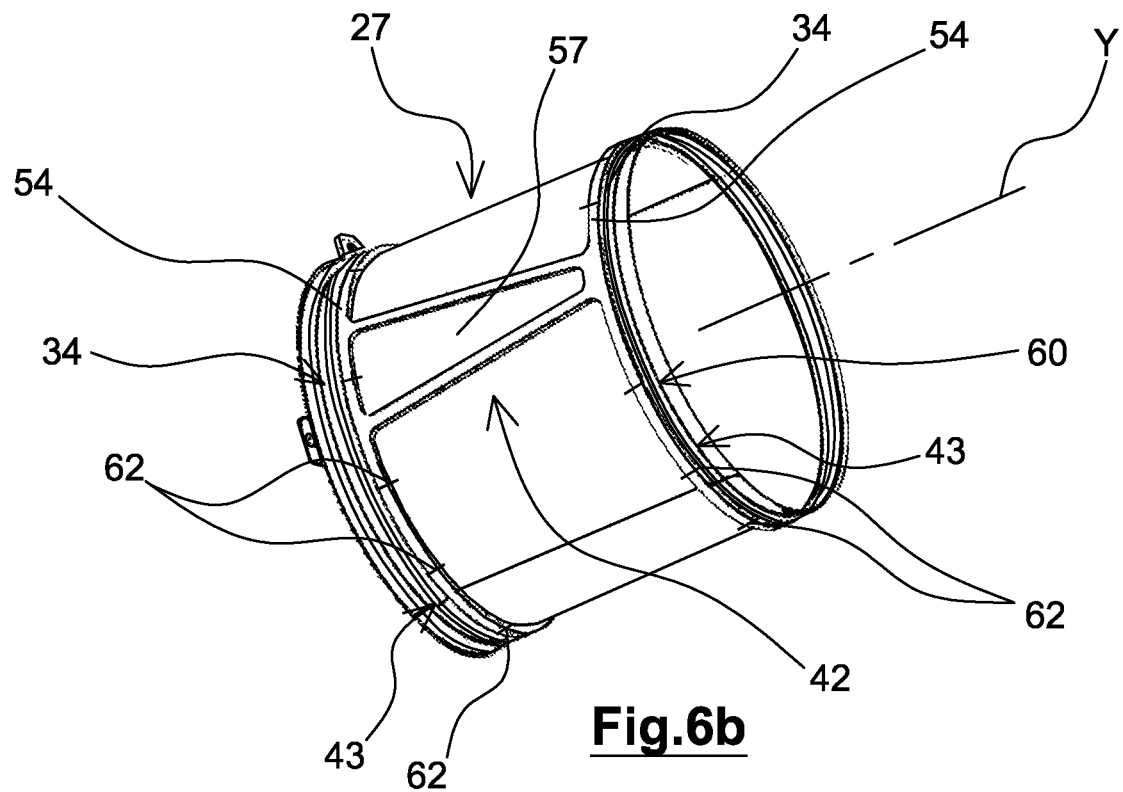

In order to retain in position the wall 42 which is snapped onto the tubular ring 27, it is possible to provide a device 60 for retention in rotation of the separation wall 42, as illustrated by FIGS. 6a and 6b. In the case when the separation wall 42 is made of plastic material, the device 60 for retention in rotation comprises bosses 61 provided on the side of an outer face of the ring 27. As shown in FIG. 6a, the bosses 61 are positioned in the recess 57 in the separation wall 42. As a variant, the bosses 61 can be positioned on both sides of a separation wall 42 without a recess.

In the case when the separation wall 42 is made of metal, the device 60 for retention in rotation comprises welds 62 formed between a securing unit 43 and the rim 34 of the groove 31. This is illustrated by FIG. 6b.

It should be noted that the rotor of the machine, not represented in the figures, can comprise a body formed by a stack of metal plate sheets which are retained in the form of a set by means of an appropriate securing system. The rotor comprises poles formed for example by permanent magnets accommodated in cavities provided in the magnetic mass of the rotor. Alternatively, in a so-called "projecting" poles architecture, the poles are formed by coils wound around arms of the rotor.

It will be appreciated that the foregoing description has been provided purely by way of example, and does not limit the scope of the invention, a departure from which would not be constituted by replacing the different elements by any other equivalents.

In addition, the different characteristics, variants and/or embodiments of the present invention can be associated with one another according to various combinations, provided that they are not incompatible or mutually exclusive.

The invention claimed is:

1. A rotary electrical machine comprising:
a rotary bearing;
a stator comprising a stator body, wherein the stator is supported within the rotary bearing;
a tubular ring, the stator body being shrink-fitted in the tubular ring;
a cooling chamber for the circulation of cooling liquid delimited by an outer periphery of the tubular ring and an inner periphery of the rotary bearing;
the rotary bearing comprising a cooling liquid intake and outlet,
wherein the rotary electrical machine comprises a separation wall to separate the cooling chamber which extends between the intake and the outlet for the cooling liquid, such that the cooling liquid circulates from the intake to the outlet for the cooling liquid, the separation wall being added-on relative to the tubular ring, and
securing units that retain the separation wall on the tubular ring are formed on a portion of a body of the separation wall at the ends of the separation wall.

2. The rotary electrical machine according to claim 1, wherein the separation wall extends in a straight manner.

3. The rotary electrical machine according to claim 2, wherein the separation wall is inclined relative to an axis of the tubular ring.

4. The rotary electrical machine according to claim 1, wherein the separation wall has a curved form.

5. The rotary electrical machine according to claim 1, wherein the said separation wall comprises a central recess that forms a space between the said intake and the said outlet for the cooling liquid, such as to be isolated from the cooling liquid when the cooling liquid is circulating in the cooling chamber.

6. The rotary electrical machine according to claim 1, wherein the said separation wall is in the form of a spiral wound around the tubular ring.

7. The rotary electrical machine according to claim 1, wherein the separation wall has a cross-section with a rectangular form.

8. The rotary electrical machine according to claim 1, wherein the tubular ring comprises two annular grooves each positioned at an axial end of the tubular ring, each annular gorge being provided in a rim relative to an outer face of the tubular ring, the annular grooves being designed to receive a seal in order to ensure the sealing of the cooling chamber.

9. The rotary electrical machine according to claim 8, wherein the securing units comprise securing lugs which are welded onto a rim of an annular groove.

10. The rotary electrical machine according to claim 9, wherein, at each end of the separation wall, the securing lugs extend on both sides of the separation wall.

11. The rotary electrical machine according to claim 9, wherein the said separation wall and the securing units are made of metal.

12. The rotary electrical machine according to claim 1, wherein the said securing units form a collar which is open and resiliently deformable in order to be able to be snapped onto an outer periphery of the said tubular ring.

13. The rotary electrical machine according to claim 12, further comprising a device for retention in rotation of the said separation wall.

14. The rotary electrical machine according to claim 12, wherein the said separation wall is made of plastic material.

15. The rotary electrical machine according to claim 13, wherein the said device for retention in rotation comprises bosses provided on the side of an outer face of the said tubular ring.

* * * * *